US012659471B2

(12) United States Patent
Zhang et al.

(10) Patent No.: US 12,659,471 B2
(45) Date of Patent: Jun. 16, 2026

(54) METHOD, DEVICE, AND MEDIUM FOR VIDEO PROCESSING

(71) Applicant: Bytedance Inc., Los Angeles, CA (US)

(72) Inventors: Kai Zhang, Los Angeles, CA (US); Li Zhang, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 207 days.

(21) Appl. No.: 18/288,015

(22) PCT Filed: Apr. 21, 2022

(86) PCT No.: PCT/US2022/071847
§ 371 (c)(1),
(2) Date: Oct. 23, 2023

(87) PCT Pub. No.: WO2022/226523
PCT Pub. Date: Oct. 27, 2022

(65) Prior Publication Data
US 2024/0205394 A1 Jun. 20, 2024

Related U.S. Application Data

(60) Provisional application No. 63/178,875, filed on Apr. 23, 2021.

(51) Int. Cl.
| | |
|---|---|
| *H04N 19/117* | (2014.01) |
| *H04N 19/159* | (2014.01) |
| *H04N 19/82* | (2014.01) |
| *H04N 19/86* | (2014.01) |

(52) U.S. Cl.
CPC ......... *H04N 19/117* (2014.11); *H04N 19/159* (2014.11); *H04N 19/82* (2014.11); *H04N 19/86* (2014.11)

(58) Field of Classification Search
CPC .......................... H04N 19/117; H04N 19/159
USPC ...................................... 375/240.21
See application file for complete search history.

(56) References Cited

U.S. PATENT DOCUMENTS

| | | |
|---|---|---|
| 2009/0046941 A1 | 2/2009 | Mietens et al. |
| 2013/0101034 A1* | 4/2013 | Wahadaniah .......... H04N 19/58 |
| | | 375/E7.243 |
| 2013/0182755 A1 | 7/2013 | Chen et al. |
| 2015/0201212 A1* | 7/2015 | Zhang .................. H04N 19/577 |
| | | 375/240.15 |
| 2015/0222821 A1 | 8/2015 | Shaburova |

(Continued)

OTHER PUBLICATIONS

International Search Report in PCT/US2022/071847, mailed Jul. 28, 2022, 4 pages.

(Continued)

*Primary Examiner* — Amir Shahnami
(74) *Attorney, Agent, or Firm* — Astute IP Law Group

(57) ABSTRACT

Embodiments of the present disclosure provide a solution for video processing. A method for video processing is proposed. The method comprises: reordering a plurality of samples in a region of a video during a conversion between the region and a bitstream of the video; and performing the conversion based on the reordered plurality of samples. Compared with the conventional solution, the proposed method can advantageously improve the coding efficiency.

22 Claims, 8 Drawing Sheets

(56) References Cited

U.S. PATENT DOCUMENTS

2016/0191931 A1 * 6/2016 Hannuksela ......... H04N 19/105
375/240.12

OTHER PUBLICATIONS

Adluru et al. "Reordering for improved constrained reconstruction from undersampled k-space data", International Journal of Biomedical Imaging, vol. 2008, Dec. 11, 2008, 12 pages.
Kastrinaki et al. "A survey of video processing techniques for traffic applications", Image and Vision Computing, vol. 21, Issue 4, Apr. 1, 2003, 25 pages.

* cited by examiner

Current picture

600

605

REORDER A PLURALITY OF SAMPLES IN A REGION OF A VIDEO DURING A CONVERSION BETWEEN THE REGION AND A BITSTREAM OF THE VIDEO

610

PERFORM THE CONVERSION BASED ON THE REORDERED PLURALITY OF SAMPLES

700

705

DETERMINE, DURING A CONVERSION BETWEEN A REGION OF A VIDEO AND A BITSTREAM OF THE VIDEO, WHETHER REORDERING OF A PLURALITY OF SAMPLES IS APPLIED IN THE REGION

710

PERFORM THE CONVERSION, THE BITSTREAM INCLUDING AT LEAST ONE OF: A FIRST INDICATION OF WHETHER TO APPLY THE REORDERING, OR A SECOND INDICATION OF A REORDERING SCHEME FOR THE REORDERING

800

METHOD, DEVICE, AND MEDIUM FOR VIDEO PROCESSING

CROSS-REFERENCE TO RELATED APPLICATIONS

This is a national stage application filed under 37 U.S.C. 371 of International Patent Application No. PCT/US2022/071847, filed Apr. 21, 2022, which claims the benefit of U.S. Provisional Patent Application No. 63/178,875, entitled REORDERING OF RECONSTRUCTION SAMPLES, and filed on Apr. 23, 2021, the disclosures of which are incorporated herein by reference in their entireties.

FIELD

Embodiments of the present disclosure relates generally to video coding techniques, and more particularly, to sample reordering in video coding.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally very low, which is undesirable.

SUMMARY

Embodiments of the present disclosure provide a solution for video processing.

In a first aspect, a method for video processing is proposed. The method comprises: reordering a plurality of samples in a region of a video during a conversion between the region and a bitstream of the video; and performing the conversion based on the reordered plurality of samples. Compared with the conventional solution, the proposed method can advantageously improve the encoding/decoding efficiency.

In a second aspect, another method for video processing is proposed. The method comprises: determining, during a conversion between a region of a video and a bitstream of the video, whether reordering of a plurality of samples is applied in the region; and performing the conversion, the bitstream including at least one of: a first indication of whether to apply the reordering, or a second indication of a reordering scheme for the reordering.

In a third aspect, an apparatus for processing video data is proposed. The apparatus comprises: a processor and a non-transitory memory with instructions thereon, wherein the instructions upon execution by the processor, cause the processor to perform a method in accordance with the first or second aspect.

In a fourth aspect, a non-transitory computer-readable storage medium is proposed. The non-transitory computer-readable storage medium stores instructions that cause a processor to perform a method in accordance with the first or second aspect.

In a fifth aspect, a non-transitory computer-readable recording medium is proposed. The non-transitory computer-readable recording medium stores a bitstream of a video which is generated by a method performed by a video processing apparatus. The method comprises: reordering a plurality of samples in a region of the video; and generating the bitstream based on the reordered plurality of samples.

In a sixth aspect, a method for storing a bitstream of a video is proposed. The method comprises: reordering a plurality of samples in a region of the video; generating the bitstream based on the reordered plurality of samples; and storing the bitstream in a non-transitory computer-readable recording medium.

In a seventh aspect, a non-transitory computer-readable recording medium is proposed. The non-transitory computer-readable recording medium stores a bitstream of a video which is generated by a method performed by a video processing apparatus. The method comprises: determining whether reordering of a plurality of samples is applied in a region of the video; and generating the bitstream based on the determining, the bitstream including at least one of: a first indication of whether to apply the reordering, or a second indication of a reordering scheme for the reordering.

In an eighth aspect, a method for storing a bitstream of a video is proposed. The method comprises: determining whether reordering of a plurality of samples is applied in a region of the video; and generating the bitstream based on the determining, the bitstream including at least one of: a first indication of whether to apply the reordering, or a second indication of a reordering scheme for the reordering; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
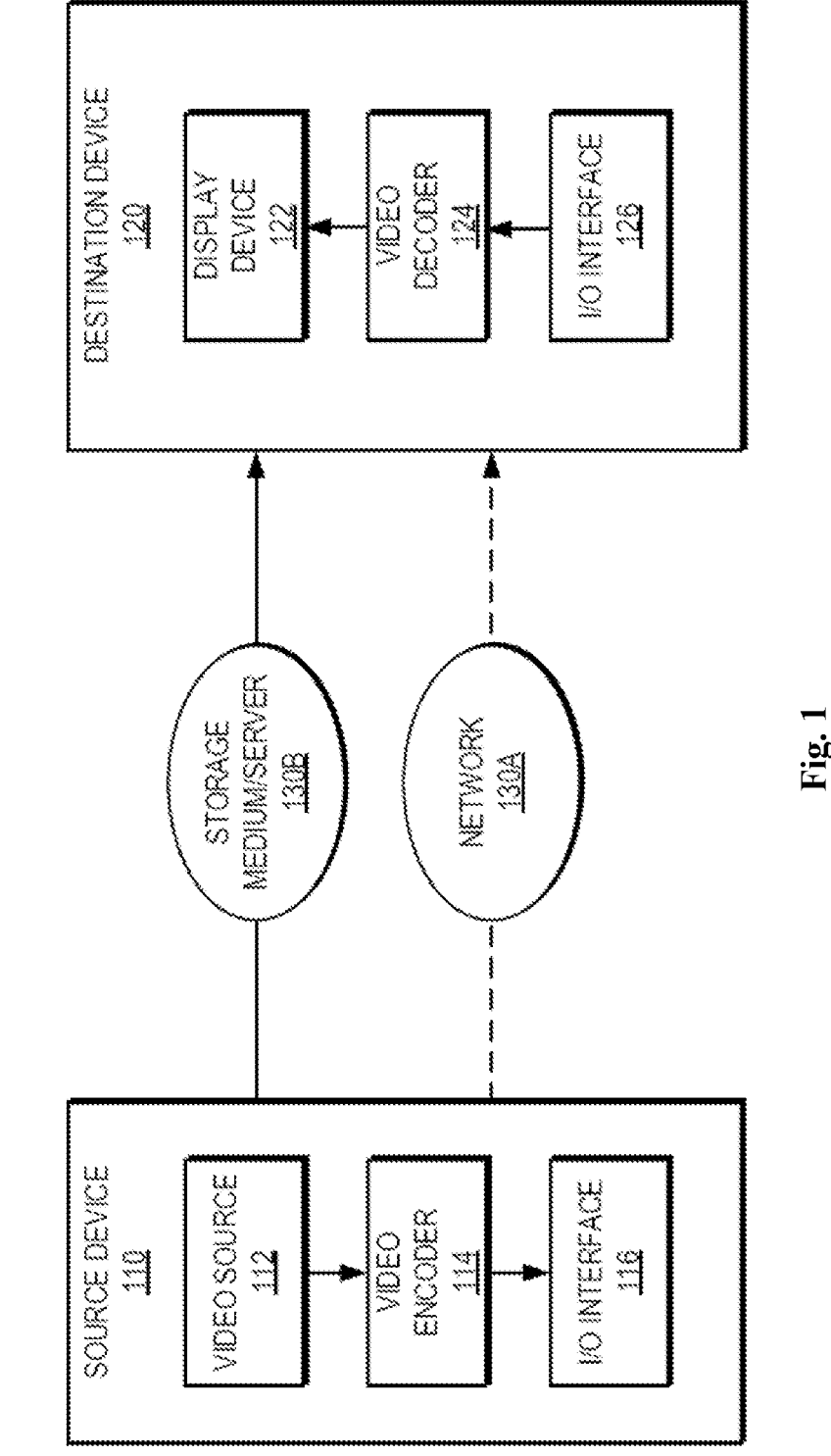
FIG. 1 is a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
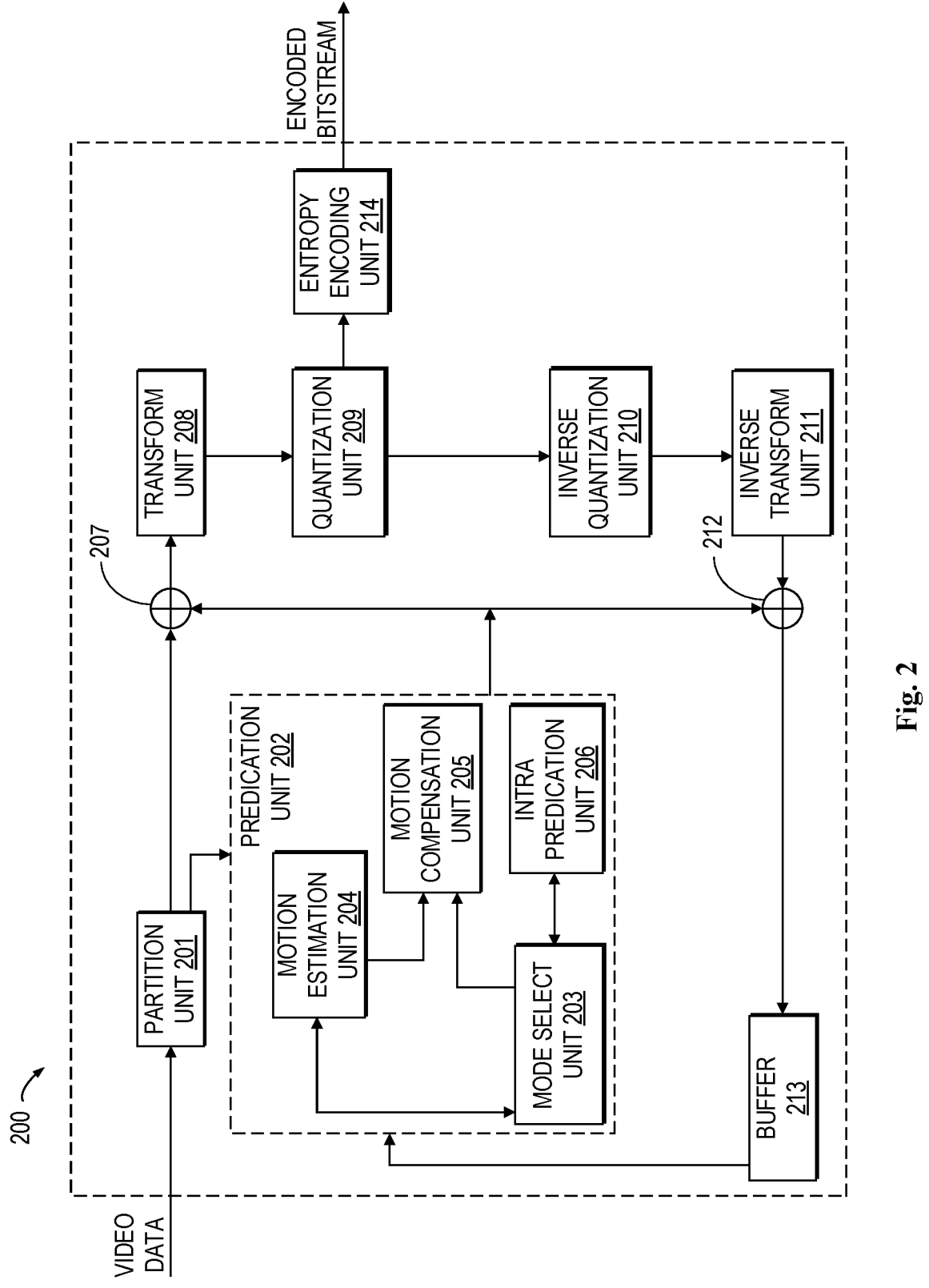
FIG. 2 is a block diagram that illustrates an example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
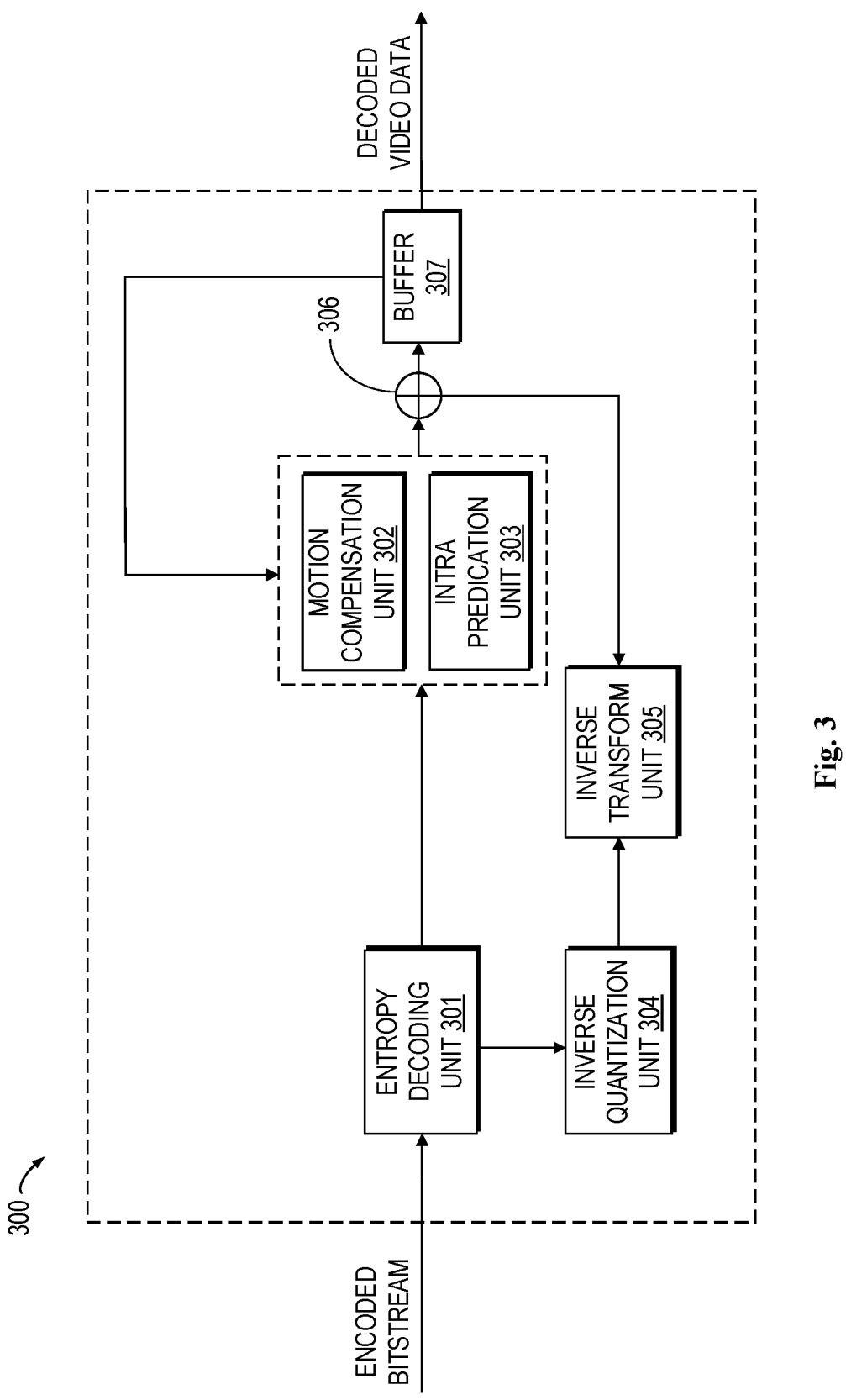
FIG. 3 is a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This invention is related to video coding technologies. Specifically, it is related to sample reordering in video coding. It may be applied to the existing video coding standard like HEVC, or the standard Versatile Video Coding (VVC). It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/ HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC. The latest version of VVC draft, i.e., Versatile Video Coding (Draft 8) could be found at: http://phenix.it-sudparis.eu/jvet/doc_end_user/current_document.php?id=9675 The latest reference software of VVC, named VTM, could be found at: https://vcgit.hhi-.fraunhofer.de/jvet/VVCSoftware_VTM/tags/VTM-8.0

2.1 Coding Flow of a Typical Video Codec

Figure 4:
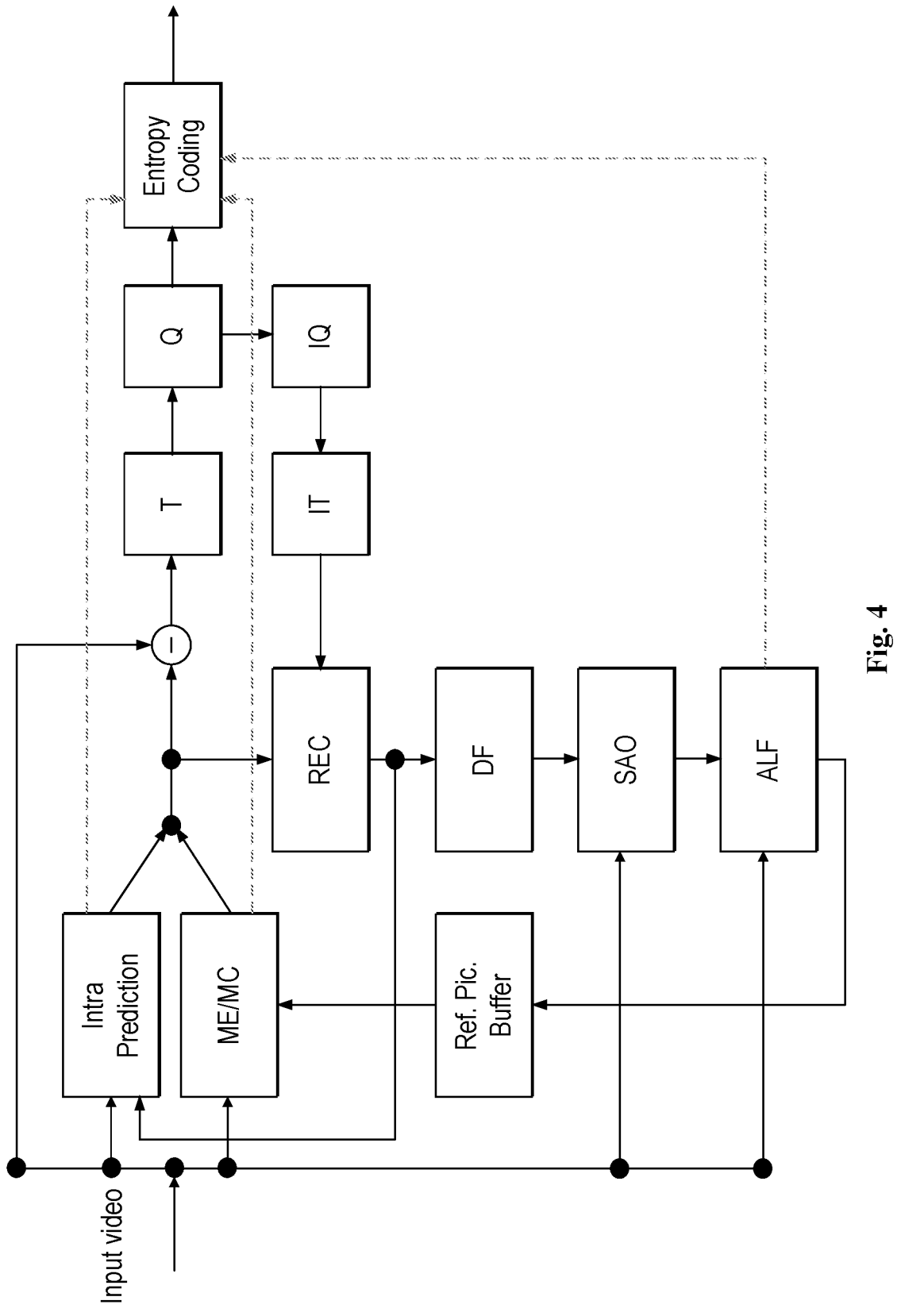
FIG. 4 illustrates a block diagram of an example encoder in accordance with some embodiments of the present disclosure.

FIG. 4 shows an example of encoder block diagram of VVC, which contains prediction module (such as inter-prediction or intra-prediction), transform/quantization, dequantization/inverse-transform, reconstruction, entropy coding, deblocking, sample adaptive offset (SAO), and adaptive loop-filter (ALF).

2.2 Intra-Block Copy (IBC)

Figure 5:
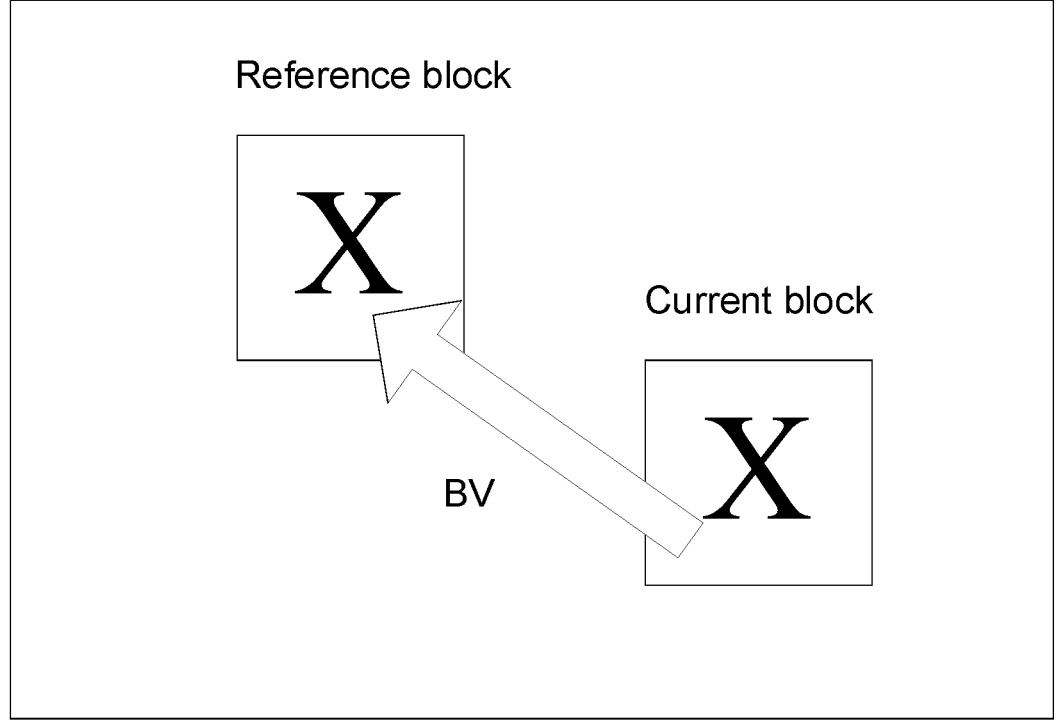
FIG. 5 illustrates an example coding process in accordance with some embodiments of the present disclosure.

Intra-Block Copy (IBC) has been adopted in HEVC Screen Content Coding Extensions Profile. IBC extends the concept of motion compensation from inter-frame coding to intra-frame coding. As demonstrated in FIG. 5, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of reduplicated patterns, such as icons and text characters in a screen content picture. IBC can remove the redundancy between these reduplicated patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB).

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

In JEM, sub-block based prediction is adopted in several coding tools, such as affine prediction, Alternative temporal motion vector prediction (ATMVP), spatial-temporal motion vector prediction (STMVP), Bi-directional Optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

3. Problems

In the current design of video coding, the position of each sample in a block is fixed. This may be inefficient.

4. Detailed Descriptions

The detailed descriptions below should be considered as examples to explain general concepts. These detailed descriptions should not be interpreted in a narrow way. Furthermore, these detailed descriptions can be combined in any manner.

In the following disclosure, a block may refer to a coding block (CB), a coding unit (CU), a prediction block (PB), a prediction unit (PU), a transform block (TB), a transform unit (TU), a sub-block, a sub-CU, a coding tree unit (CTU), a coding tree block (CTB), or a coding group (CG).

In the following disclosure, a region may refer to any video unit, such as a picture, a slice or a block. A region may also refer to a non-rectangular region, such as a triangular.

In the following disclosure, W and H represents the width and height of a mentioned rectangular region.

1. It is proposed that the samples in a region may be reordered.
   a. Reordering of samples may be defined as following: Suppose the sample at position (x, y) in a region before reordering is denoted as $S(x, y)$, and the sample at position (x, y) in a region after reordering is denoted as $R(x, y)$. It is required that $R(x, y)=S(f(x, y), g(x, y))$, wherein $(f(x, y), g(x, y))$ is a position in the region, f and g are two functions.
      i. For example, it is required that there is at least one position (x, y) satisfying that $(f(x, y), g(x, y))$ is not equal to (x, y).
   b. The samples in a region to be reordered may be
      i. Original samples before encoding
      ii. Prediction samples
      iii. Reconstruction samples
      iv. Transformed samples (transformed coefficients)
      v. Samples before inverse-transform (coefficients before inverse-transform)
      vi. Samples before deblocking filtering
      vii. Samples after deblocking filtering
      viii. Samples before SAO processing
      ix. Samples after SAO processing
      x. Samples before ALF processing
      xi. Samples after ALF processing
      xii. Samples before post processing
      xiii. Samples after post processing
   c. In one example, reordering may be applied at more than one stage.
      i. For example, at least two of these samples listed in bullet 1.b may be reordered.
         1) For example, different reordering methods may be applied on the two kinds of samples.
         2) For example, the same reordering method may be applied on the two kinds of samples.
   d. In one example, reordering may be a horizontal flip. For example, $f(x, y)=P-x$, $g(x, y)=y$. E.g. $P=W-1$.
   e. In one example, reordering may be a vertical flip. For example, $f(x, y)=x$, $g(x, y)=Q-y$. E.g. $Q=H-1$.
   f. In one example, reordering may be a horizontal-vertical flip. For example, $f(x, y)=P-x$, $g(x, y)=Q-y$. E.g. $P=W-1$ and $Q=H-1$.
   g. In one example, reordering may be a shift. For example, $f(x, y)=(P+x) \% W$, $g(x, y)=(Q+y) \% H$, wherein P and Q are integers.
   h. In one example, reordering may be a rotation.
   i. In one example, there is at least one (x, y) satisfying (x, y) is equal to $(f(x,y), g(x,y))$.
   j. In one example, whether to and/or how to reorder the samples may be signaled from the encoder to the decoder, such as in SPS/sequence header/PPS/picture header/APS/slice header/sub-picture/tile/CTU line/CTU/CU/PU/TU.

i. For example, a first flag is signaled to indicate whether reordering is applied.

1) E.g., the first flag may be coded with context coding.

ii. For example, a second syntax element (such as a flag) is signaled to indicate which reordering method is used (such as horizontal flip or vertical flip).

1) E.g. the second syntax element is signaled only if it is indicated that reordering is applied.

2) E.g., the second syntax element may be coded with context coding.

2. It is proposed that whether to and/or how to reorder the samples may depend on coding information.

a. In one example, whether to and/or how to reorder the samples may be derived depending on coding information at picture level/slice level/CTU level/CU level/PU level/TU level.

b. In one example, the coding information may comprise:

i. Dimensions of the region ii. Coding mode of the region (such as inter, intra or IBC)

iii. Motion information (such as motion vectors and reference indices).

iv. Intra-prediction mode (such as angular intra-prediction mode, Planar or DC).

v. Inter-prediction mode (such as affine prediction, bi-prediction/uni-prediction, merge mode, combined inter-intra prediction (CIIP), merge with motion vector difference (MMVD), temporal motion vector prediction (TMVP), sub-TMVP).

vi. Quantization parameter (QP).

vii. Coding tree splitting information such as coding tree depth.

viii. Color format and/or color component.

3. It is proposed that at least one parsing or decoding procedure other than the reordering procedure may depend on whether to and/or how to reorder samples.

a. For example, a syntax element may be signaled conditionally based on whether reordering is applied or not.

b. For example, different scanning order may be used based on whether to and/or how to reorder samples.

c. For example, deblocking filtering/SAO/ALF may be used based on whether to and/or how to reorder samples.

4. In one example, samples may be processed by at least one auxiliary procedure before or after the resampling process. Some possible auxiliary procedures may comprise: (combination may be allowed)

a. For example, at least one sample may be added by an offset.

b. For example, at least one sample may be multiplied by a factor.

c. For example, at least one sample may be clipped.

d. For example, at least one sample may be filtered.

e. For example, at least one sample X may be modified to be T(X), wherein T is a function.

5. In one example, for a block coded with IBC mode a. For example, a first flag is signaled to indicate whether reconstruction samples should be reordered.

i. E.g., the first flag may be coded with context coding.

b. For example, a second flag may be signaled to indicate whether reconstruction samples should be flipped horizontally or vertically.

i. E.g. the second flag is signaled only if the first flag is true.

ii. E.g., the second flag may be coded with context coding.

Figure 6:
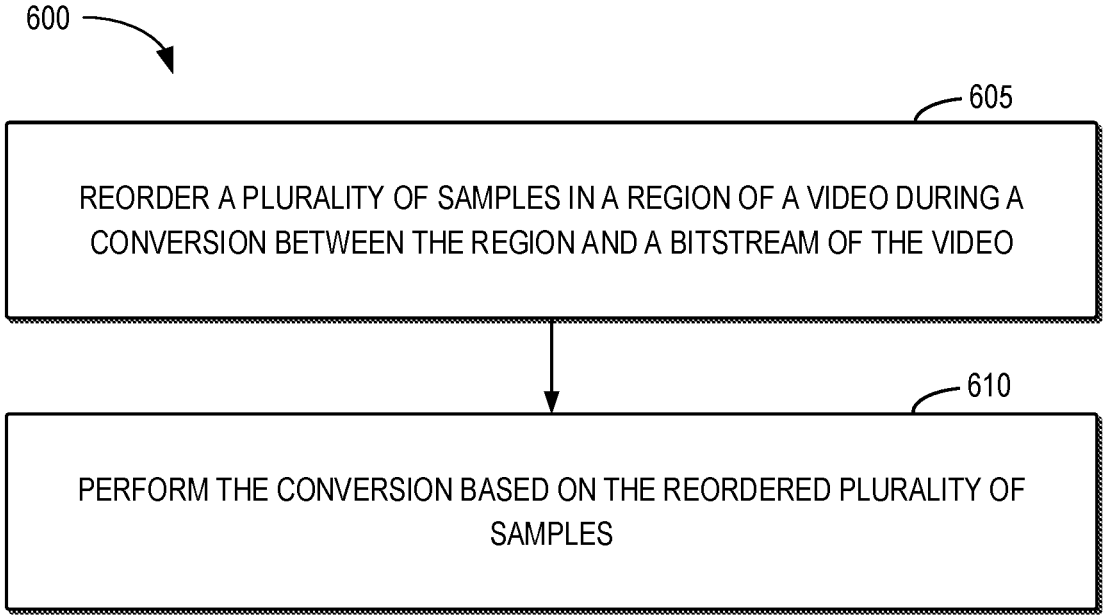
FIG. 6 illustrates a flowchart of a method for video processing in accordance with some embodiments of the present disclosure.

FIG. 6 illustrates a flowchart of a method 600 for video processing in accordance with some embodiments of the present disclosure.

At 605, a plurality of samples are reordered in a region of a video during a conversion between the region and a bitstream of the video. At 610, the conversion is performed based on the reordered plurality of samples.

According to some embodiments of the present disclosure, the position of each sample may be adaptively adjusted in a region of a video. This is more effective and efficient. Thus, the coding performance may be improved.

In some embodiments, the plurality of samples comprise at least one type of samples. The at least one type of samples comprises: a plurality of original samples before encoding, a plurality of prediction samples, a plurality of reconstruction samples, a plurality of transformed samples (such as transformed coefficients), a plurality of samples before inverse-transform(such as coefficients before inverse-transform), a plurality of samples before deblocking filtering, a plurality of samples after deblocking filtering, a plurality of samples before sample adaptive offset (SAO) processing, a plurality of samples after SAO processing, a plurality of samples before adaptive loop-filter (ALF) processing, a plurality of samples after ALF processing, a plurality of samples before post processing, and/or a plurality of samples after post processing. For example, the samples in a region to be reordered may be one or more of the above types of samples.

In some embodiments, the reordering of the plurality of samples may comprise operations at more than one stage. In one example, reordering may be applied at more than one stage. For example, at least two types of samples as mentioned above may be reordered.

In some embodiments, the plurality of types of samples may be reordered in different reordering schemes. For example, different reordering schemes may be applied on two types of samples.

In some embodiments, at least two types of the plurality of types of samples may be reordered in one reordering scheme. For example, the same reordering method may be applied on two types of samples.

In some embodiments, for a sample of the plurality of samples, changing an original position of the sample in the region may be changed to a reordered position in the region by using:

$$R(x,y){=}S(f(x,y){,}g(x,y)),$$

where $(x, y)$ represents the original position, $(f(x, y), g(x, y))$ represents the reordered position, $f$ and $g$ represent two functions, $S$ represents the sample at the original position before the reordering, $R$ represents the reordered sample at the reordered position after the reordering.

Thus, reordering of samples may be defined as above. For a sample $S(x, y)$ at a position $(x, y)$ in the region before reordering, it is required that the reordered sample $R{=}S(f(x, y), g(x, y))$. In some embodiments, the reordered position is different from the original position. For example, it may be required that there is at least one position $(x, y)$ satisfying that $(f(x, y), g(x, y))$ is not equal to $(x, y)$.

In some embodiments, the reordered position is the same as the original position. In one example, there may be at least one (x, y) satisfying (x, y) is equal to (f(x,y), g(x,y)).

In some embodiments, the plurality of samples may be reordering in at least one reordering scheme. The at least one reordering scheme may comprise a horizontal flip, a vertical flip, a horizontal-vertical flip, a shift and/or a rotation.

In one example, reordering may be a horizontal flip. For example, f(x, y)=P−x, g(x, y)=y, where P is an integer, x<P<W. In some embodiments, P=W−1. W represents a width of the region. The region may be a rectangular region.

In one example, reordering may be a vertical flip. For example, f(x, y)=x, g(x, y)=Q−y, where Q is an integer, y<Q<H. In some embodiments, Q=H−1. H represents a height of the region In one example, reordering may be a horizontal-vertical flip. For example, f(x, y)=P−x, g(x, y)=Q−y. In some embodiments, P=W−1 and Q=H−1.

In one example, reordering may be a shift. For example, f(x, y)=(P+x) % W, g(x, y)=(Q+y) % H, where P and Q are integers.

In some embodiments, at least one sample of the plurality of samples may be processed by at least one auxiliary procedure before and/or after the reordering. The at least one auxiliary procedure comprises at least one of: adding at least one offset to the at least one sample, multiplying the at least one sample by at least one factor, clipping the at least one sample, filtering the at least one sample, or modifying the at least one sample based on T(X), wherein X represents a sample of the at least one sample and T represents a function.

For example, at least one sample may be added by an offset. For example, at least one sample may be multiplied by a factor. For example, at least one sample may be clipped. For example, at least one sample may be filtered. For example, at least one sample X may be modified to be T(X).

Figure 7:
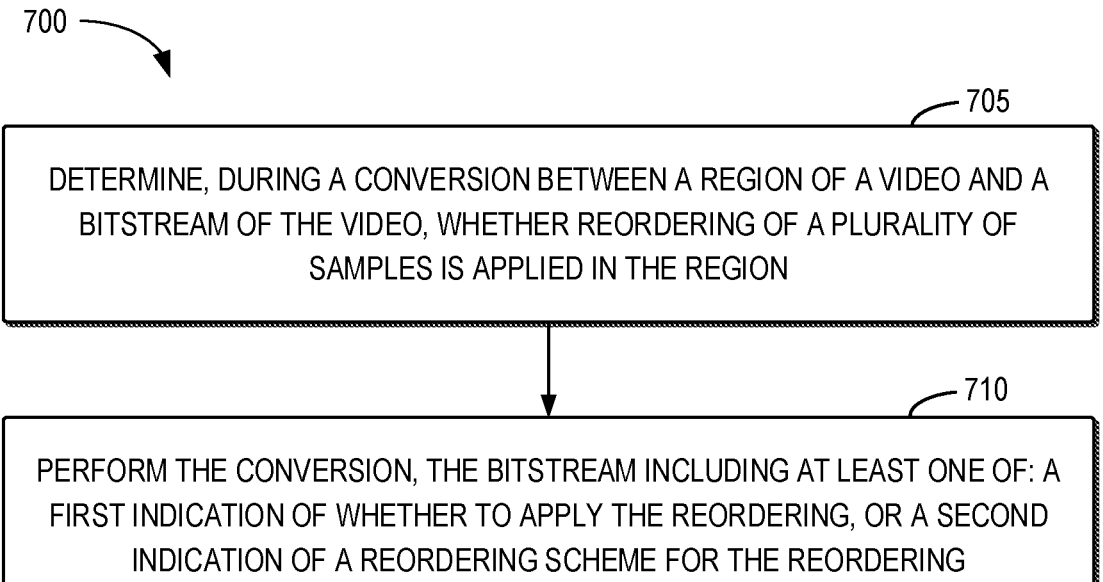
FIG. 7 illustrates a flowchart of another method for video processing in accordance with some embodiments of the present disclosure.

FIG. 7 illustrates a flowchart of another method 700 for video processing in accordance with some embodiments of the present disclosure.

At 705, it is determined, during a conversion between a region of a video and a bitstream of the video, whether reordering of a plurality of samples is applied in the region. At 710, the conversion is performed. The resulted bitstream includes at least one of: an indication (referred to as "a first indication") of whether to apply the reordering, or an indication (referred to as "a second indication") of a reordering scheme for the reordering. The first and second indications may be an explicit or implicit indication.

According to some embodiments of the present disclosure, whether to and/or how to reorder the samples may be signaled from the encoder to the decoder. Such adaptive adjustment of the position of each sample may improve the coding performance and allow the video processing more effective and efficient.

In some embodiments, the at least one of the first and second indications is included in at least one of a sequence parameter set, a sequence header, a picture parameter set, a picture header, an adaptive parameter set, a slice header, a sub-picture, a tile, a coding tree unit (CTU), a coding unit (CU), a prediction unit (PU) or a transform unit (TU) associated with the region.

In some embodiments, the first indication may comprise a flag (referred to as "a first flag") to indicate whether the reordering is applied. In some embodiments, the first flag may be coded with context coding.

In some embodiments, the second indication may be carried by a syntax element (referred as "a first syntax element") associated with the region. In some embodiments, the first syntax element may be coded with context coding.

In some embodiments, the reordering scheme may be determined from a horizontal flip and a vertical flip. In these embodiments, the second indication comprises a flag (referred to as "a second flag") to indicate whether the horizontal flip or the vertical flip is used for the reordering. In some embodiments, the second indication may be included in the bitstream if the reordering is applied.

For example, the first syntax element carrying the second indication (such as the second flag) is signaled to indicate which reordering method is used (such as horizontal flip or vertical flip). In one example, the first syntax element may be signaled only if it is indicated that reordering is applied.

In some embodiments, the at least one of the first and second indications may be derived from coding information associated with the region. For example, whether to and/or how to reorder the samples may depend on coding information.

In some embodiments, the coding information may comprise coding information at a picture level, a slice level, a coding tree unit (CTU) level, a coding unit (CU) level, a prediction unit (PU) level and/or a transform unit (TU) level. In some embodiments, the coding information comprises at least one of: dimensions of the region, at least one coding mode of the region, at least one motion information associated with the region, at least one intra-prediction mode associated with the region, at least one inter-prediction mode associated with the region, at least one quantization parameter (QP) associated with the region, coding tree splitting information associated with the region, or at least one color format and/or color component associated with the region.

In some embodiments, the at least one coding mode may comprise inter coding, intra coding and/or Intra-Block Copy (IBC). In some embodiments, the at least one motion information may comprise motion vectors and reference indices. In some embodiments, the at least one intra-prediction mode may comprise an angular intra-prediction mode, a planar mode and/or a Direct Currency (DC) mode. In some embodiments, the at least one inter-prediction mode may comprise affine prediction, bi-prediction/uni-prediction, merge mode, combined inter-intra prediction (CIIP), merge with motion vector difference (MMVD), temporal motion vector prediction (TMVP) and/or sub-TMVP. In some embodiments, the coding tree splitting information may comprise a coding tree depth.

In some embodiments, the bitstream further includes an indication (referred to as "a third indication") whether at least one of a parsing scheme or a decoding scheme for the region depends on: whether the reordering is applied, and/or the reordering scheme for the reordering. As such, at least one parsing or decoding procedure other than the reordering procedure may depend on whether to and/or how to reorder samples.

In some embodiments, the third indication is carried by a syntax element (referred to as "a second syntax element") associated with the region. In some embodiments, the third indication may be included in the bitstream if the reordering is applied. For example, the second syntax element carrying the third indication may be signaled conditionally based on whether reordering is applied or not.

In some embodiments, the at least one of the parsing scheme or the decoding scheme may comprise a scanning order. For example, different scanning orders may be used based on whether to and/or how to reorder samples.

Alternatively or in addition, the at least one of the parsing scheme or the decoding scheme may comprise a filtering scheme. In some embodiments, the filtering scheme may comprises deblocking filtering, sample adaptive offset (SAO) processing or adaptive loop-filter (ALF) processing. For example, deblocking filtering/SAO/ALF may be used based on whether to and/or how to reorder samples.

In some embodiments, the region comprises a block coded with an Intra-Block Copy (IBC) mode. The bitstream may further comprise: an indication (referred to as "a fourth indication") whether the plurality of samples comprise a plurality of reconstruction samples, and/or an indication (referred to as "a fifth indication") of at least one reordering scheme for reconstruction samples.

In some embodiments, the fourth indication may comprise a flag (referred to as "a third flag") to indicate whether a reconstruction sample is to be reordered. In some embodiments, the third flag may be coded with context coding.

In the embodiments where at least one reordering scheme comprises a horizontal flip and a vertical flip, the fifth indication for the reordering scheme may comprise a flag (referred to as "a fourth flag") to indicate whether the reconstruction samples are to be flipped horizontally or vertically. In some embodiments, the fourth flag may be coded with context coding.

In some embodiments, the fifth indication may be included in the bitstream if the plurality of samples comprise the plurality of reconstruction samples. For example, the fifth indication for the reordering scheme may be signaled only if the third flag is true to indicate that a reconstruction sample is to be reordered.

It is to be understood that the methods 600 and/or 700 may be implemented at the source device 110 (or the video encoder 114 or 200) or the destination device 120 (or the video decoder 124 or 300).

Implementations of the present disclosure can be described in view of the following clauses, the features of which can be combined in any reasonable manner.

Clause 1. A method of video processing, comprising: reordering a plurality of samples in a region of a video during a conversion between the region and a bitstream of the video; and performing the conversion based on the reordered plurality of samples.

Clause 2. The method of clause 1, wherein the plurality of samples comprise at least one type of samples, the at least one type of samples comprising: a plurality of original samples before encoding, a plurality of prediction samples, a plurality of reconstruction samples, a plurality of transformed samples, a plurality of samples before inverse-transform, a plurality of samples before deblocking filtering, a plurality of samples after deblocking filtering, a plurality of samples before sample adaptive offset (SAO) processing, a plurality of samples after SAO processing, a plurality of samples before adaptive loop-filter (ALF) processing, a plurality of samples after ALF processing, a plurality of samples before post processing, and/or a plurality of samples after post processing.

Clause 3. The method of clause 1, wherein reordering the plurality of samples comprises operations at more than one stage.

Clause 4. The method of clause 3, wherein the plurality of types of samples are reordered in different reordering schemes.

Clause 5. The method of clause 3, wherein at least two types of the plurality of types of samples are reordered in one reordering scheme.

Clause 6. The method of any of clauses 1-5, wherein reordering the plurality of samples comprises: for a sample of the plurality of samples, changing an original position of the sample in the region to a reordered position in the region based on: $R=S(f(x, y), g(x, y))$, wherein S represents the sample at the original position before the reordering, R represents the reordered sample at the reordered position after the reordering, $(x, y)$ represents the original position, $(f(x, y), g(x, y))$ represents the new reordered position, f and g represent two functions, S represents the sample at the original position before the reordering, R represents the reordered sample at the reordered position after the reordering.

Clause 7. The method of clause 6, wherein the reordered position is different from the original position.

Clause 8. The method of clause 6, wherein the reordered position is the same as the original position.

Clause 9. The method of any of clauses 6-8, wherein the plurality of samples are reordering in at least one reordering scheme, the at least one reordering scheme comprising a horizontal flip, a vertical flip, a horizontal-vertical flip, a shift and/or a rotation.

Clause 10. The method of clause 9, wherein the sample of the plurality of samples is horizontally flipped, and $f(x, y)=P-x$, $g(x, y)=y$, wherein P is an integer, $x<P<W$, and W represents a width of the region.

Clause 11. The method of clause 10, wherein $P=W-1$.

Clause 12. The method of clause 9, wherein the sample of the plurality of samples is vertically flipped, and $f(x, y)=x$, $g(x, y)=Q-y$, wherein Q is an integer, $y<Q<H$, and H represents a height of the region.

Clause 13. The method of clause 12, wherein $Q=H-1$.

Clause 14. The method of clause 9, wherein the sample of the plurality of samples is horizontally-vertically flipped, and $f(x, y)=P-x$, $g(x, y)=Q-y$, $x<P<W$, $y<Q<H$, W represents a width of the region, and H represents a height of the region.

Clause 15. The method of clause 14, wherein $P=W-1$ and $Q=H-1$.

Clause 16. The method of clause 9, wherein the sample of the plurality of samples is shifted, and $f(x, y)=(P+x) \% W$, $g(x,y)=(Q+y) \% H$, P and Q are integers, W represents a width of the region, and H represents a height of the region.

Clause 17. The method of any of clauses 1-16, wherein at least one sample of the plurality of samples is processed by at least one auxiliary procedure before and/or after the reordering.

Clause 18. The method of clause 17, wherein the at least one auxiliary procedure comprises at least one of: adding at least one offset to the at least one sample, multiplying the at least one sample by at least one factor, clipping the at least one sample, filtering the at least one sample, or modifying the at least one sample based on $T(xX)$, wherein X represents a sample of the at least one sample and T represents a function.

Clause 19. The method of any of clauses 1-18, wherein the conversion comprises encoding the region into the bitstream.

Clause 20. The method of any of clauses 1-18, wherein the conversion comprises decoding the region from the bitstream.

Clause 21. A method of video processing, comprising: determining, during a conversion between a region of a video and a bitstream of the video, whether reordering of a plurality of samples is applied in the region; and performing the conversion, the bitstream including at least one of: a first indication of whether to apply the reordering, or a second indication of a reordering scheme for the reordering.

Clause 22. The method of clause 21, wherein the at least one of the first and second indications is included in at least one of a sequence parameter set, a sequence header, a picture parameter set, a picture header, an adaptive parameter set, a slice header, a sub-picture, a tile, a coding tree unit (CTU), a coding unit (CU), a prediction unit (PU) or a transform unit (TU) associated with the region.

Clause 23. The method of clause 21 or clause 22, wherein the first indication comprises a first flag to indicate whether the reordering is applied.

Clause 24. The method of clause 23, wherein the first flag is coded with context coding.

Clause 25. The method of any of clauses 21-24, wherein the second indication is carried by a first syntax element associated with the region.

Clause 26. The method of clause 25, wherein the first syntax element is coded with context coding.

Clause 27. The method of any of clauses 21-26, wherein the reordering scheme is determined from a horizontal flip and a vertical flip, and the second indication comprises a second flag to indicate whether the horizontal flip or the vertical flip is used for the reordering.

Clause 28. The method of any of clauses 21-27, wherein the second indication is included in the bitstream if the reordering is applied.

Clause 29. The method of clause 21, wherein the at least one of the first and second indications is derived from coding information associated with the region.

Clause 30. The method of clause 29, wherein the coding information comprises coding information at a picture level, a slice level, a coding tree unit (CTU) level, a coding unit (CU) level, a prediction unit (PU) level and/or a transform unit (TU) level.

Clause 31. The method of clause 29, wherein the coding information comprises at least one of: dimensions of the region, at least one coding mode of the region, at least one motion information associated with the region, at least one intra-prediction mode associated with the region, at least one inter-prediction mode associated with the region, at least one quantization parameter (QP) associated with the region, coding tree splitting information associated with the region, or at least one color format and/or color component associated with the region.

Clause 32. The method of clause 31, wherein the at least one coding mode comprises inter coding, intra coding and/or Intra-Block Copy (IBC), the at least one motion information comprises motion vectors and reference indices, the at least one intra-prediction mode comprises an angular intra-prediction mode, a planar mode and/or a Direct Currency (DC) mode, the at least one inter-prediction mode comprises affine prediction, bi-prediction/uni-prediction, merge mode, combined inter-intra prediction (CIIP), merge with motion vector difference (MMVD), temporal motion vector prediction (TMVP) and/or sub-TMVP, and/or the coding tree splitting information comprises a coding tree depth.

Clause 33. The method of any of clauses 21-31, wherein the bitstream further includes a third indication whether at least one of a parsing scheme or a decoding scheme for the region depends on: whether the reordering is applied, and/or the reordering scheme for the reordering.

Clause 34. The method of clause 33, wherein the third indication is carried by a second syntax element associated with the region.

Clause 35. The method of clause 33 or clause 34, wherein the third indication is included in the bitstream if the reordering is applied.

Clause 36. The method of any of clauses 33-35, wherein the at least one of the parsing scheme or the decoding scheme comprises a scanning order and/or a filtering scheme.

Clause 37. The method of clause 36, wherein the filtering scheme comprises deblocking filtering, sample adaptive offset (SAO) processing or adaptive loop-filter (ALF) processing.

Clause 38. The method of any of clauses 21-37, wherein the region comprises a block coded with an Intra-Block Copy (IBC) mode, and the bitstream further comprises: a fourth indication whether the plurality of samples comprise a plurality of reconstruction samples, and/or a fifth indication of at least one reordering scheme for reconstruction samples.

Clause 39. The method of clause 38, wherein the fourth indication comprises a third flag to indicate whether a reconstruction sample is to be reordered.

Clause 40. The method of clause 39, wherein the third flag is coded with context coding.

Clause 41. The method of any of clauses 38-40, wherein at least one reordering scheme comprises a horizontal flip and a vertical flip, and the fifth indication comprises a fourth flag to indicate whether the reconstruction samples are to be flipped horizontally or vertically.

Clause 42. The method of clause 41, wherein the fourth flag is coded with context coding.

Clause 43. The method of clause 41 or clause 42, wherein the fifth indication is included in the bitstream if the plurality of samples comprise the plurality of reconstruction samples.

Clause 44. The method of any of clauses 21-43, wherein the conversion includes encoding the region into the bitstream.

Clause 45. The method of any of clauses 21-43, wherein the conversion includes decoding the region from the bitstream.

Clause 46. An apparatus for processing video data comprising a processor and a non-transitory memory with instructions thereon, wherein the instructions upon execution by the processor, cause the processor to perform a method in accordance with any of clauses 1-20 or clauses 21-46.

Clause 47. A non-transitory computer-readable storage medium storing instructions that cause a processor to perform a method in accordance with any of clauses 1-20 or clauses 21-46.

Clause 48. A non-transitory computer-readable recording medium storing a bitstream of a video which is generated by a method performed by a video processing apparatus, wherein the method comprises: reordering a plurality of samples in a region of the video; and generating the bitstream based on the reordered plurality of samples.

Clause 49. A method for storing a bitstream of a video, comprising: reordering a plurality of samples in a region of the video; generating the bitstream based on the reordered plurality of samples; and storing the bitstream in a non-transitory computer-readable recording medium.

Clause 50. A non-transitory computer-readable recording medium storing a bitstream of a video which is generated by a method performed by a video processing apparatus, wherein the method comprises: determining whether reordering of a plurality of samples is applied in a region of the video; and generating the bitstream based on the determining, the bitstream including at least one of: a first indication of whether to apply the reordering, or a second indication of a reordering scheme for the reordering.

Clause 51. A method for storing a bitstream of a video, comprising: determining whether reordering of a plurality of samples is applied in a region of the video; and generating the bitstream based on the determining, the bitstream including at least one of: a first indication of whether to apply the reordering, or a second indication of a reordering scheme for the reordering; and storing the bitstream in a non-transitory computer-readable recording medium.

Example Device

Figure 8:
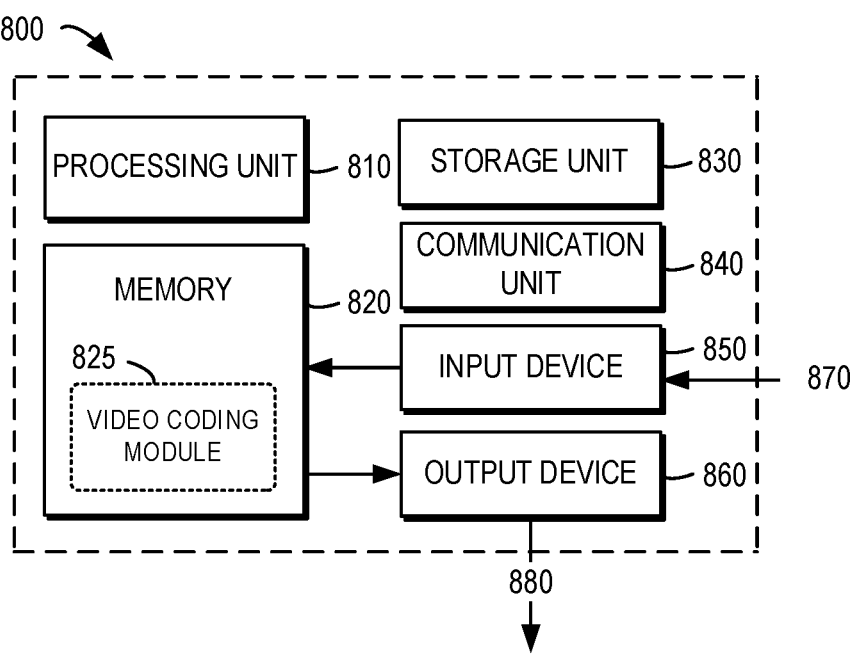
FIG. 8 illustrates a block diagram of a computing device in which various embodiments of the present disclosure can be implemented.

FIG. 8 illustrates a block diagram of a computing device 800 in which various embodiments of the present disclosure can be implemented. The computing device 800 may be implemented as or included in the source device 110 (or the video encoder 114 or 200) or the destination device 120 (or the video decoder 124 or 300).

It would be appreciated that the computing device 800 shown in FIG. 8 is merely for purpose of illustration, without suggesting any limitation to the functions and scopes of the embodiments of the present disclosure in any manner.

As shown in FIG. 8, the computing device 800 includes a general-purpose computing device 800. The computing device 800 may at least comprise one or more processors or processing units 810, a memory 820, a storage unit 830, one or more communication units 840, one or more input devices 850, and one or more output devices 860.

In some embodiments, the computing device 800 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 800 can support any type of interface to a user (such as "wearable" circuitry and the like).

The processing unit 810 may be a physical or virtual processor and can implement various processes based on programs stored in the memory 820. In a multi-processor system, multiple processing units execute computer executable instructions in parallel so as to improve the parallel processing capability of the computing device 800. The processing unit 810 may also be referred to as a central processing unit (CPU), a microprocessor, a controller or a microcontroller.

The computing device 800 typically includes various computer storage medium. Such medium can be any medium accessible by the computing device 800, including, but not limited to, volatile and non-volatile medium, or detachable and non-detachable medium. The memory 820 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 830 may be any detachable or non-detachable medium and may include a machine-readable medium such as a memory, flash memory drive, magnetic disk or another other media, which can be used for storing information and/or data and can be accessed in the computing device 800.

The computing device 800 may further include additional detachable/non-detachable, volatile/non-volatile memory medium. Although not shown in FIG. 8, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 840 communicates with a further computing device via the communication medium. In addition, the functions of the components in the computing device 800 can be implemented by a single computing cluster or multiple computing machines that can communicate via communication connections. Therefore, the computing device 800 can operate in a networked environment using a logical connection with one or more other servers, networked personal computers (PCs) or further general network nodes.

The input device 850 may be one or more of a variety of input devices, such as a mouse, keyboard, tracking ball, voice-input device, and the like. The output device 860 may be one or more of a variety of output devices, such as a display, loudspeaker, printer, and the like. By means of the communication unit 840, the computing device 800 can further communicate with one or more external devices (not shown) such as the storage devices and display device, with one or more devices enabling the user to interact with the computing device 800, or any devices (such as a network card, a modem and the like) enabling the computing device 800 to communicate with one or more other computing devices, if required. Such communication can be performed via input/output (I/O) interfaces (not shown).

In some embodiments, instead of being integrated in a single device, some or all components of the computing device 800 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 800 may be used to implement video encoding/decoding in embodiments of the present disclosure. The memory 820 may include one or more video coding modules 825 having one or more program instructions. These modules are accessible and executable by the processing unit 810 to perform the functionalities of the various embodiments described herein.

In the example embodiments of performing video encoding, the input device 850 may receive video data as an input 870 to be encoded. The video data may be processed, for example, by the video coding module 825, to generate an encoded bitstream. The encoded bitstream may be provided via the output device 860 as an output 880.

In the example embodiments of performing video decoding, the input device 850 may receive an encoded bitstream as the input 870. The encoded bitstream may be processed, for example, by the video coding module 825, to generate decoded video data. The decoded video data may be provided via the output device 860 as the output 880.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

The invention claimed is:

1. A method of video processing, comprising:
   reordering a plurality of samples in a region of a video during a conversion between the region and a bitstream of the video, wherein reordering the plurality of samples comprises changing an original position of a sample in the plurality of samples to a reordered position in the region based on a plurality of different functions for determining the reordered position using the original position; and
   performing the conversion based on the reordered plurality of samples.

2. The method of claim 1, wherein the plurality of samples comprise at least one type of samples, the at least one type of samples comprising:
   a plurality of original samples before encoding,
   a plurality of prediction samples,
   a plurality of reconstruction samples,
   a plurality of transformed samples,
   a plurality of samples before inverse-transform,
   a plurality of samples before deblocking filtering,
   a plurality of samples after deblocking filtering,
   a plurality of samples before sample adaptive offset (SAO) processing,
   a plurality of samples after SAO processing,
   a plurality of samples before adaptive loop-filter (ALF) processing,
   a plurality of samples after ALF processing,
   a plurality of samples before post processing, and/or
   a plurality of samples after post processing.

3. The method of claim 1,
   wherein the plurality of samples are reordered at more than one stage; or
   wherein the plurality of samples comprises at least two types of samples, and the at least two types of samples are reordered in different reordering schemes, or are reordered in the same reordering scheme.

4. The method of claim 1, wherein at least one respective reordered position of at least one sample of the plurality of samples is different from at least one respective original position of the at least one sample of the plurality of samples.

5. The method of claim 1, wherein at least one respective reordered position of at least one sample of the plurality of samples is the same as at least one respective original position of at least one sample of the plurality of samples.

6. The method of claim 1, wherein the plurality of samples are reordering in at least one reordering scheme, the at least one reordering scheme comprising a horizontal flip, a vertical flip, a horizontal-vertical flip, a shift and/or a rotation.

7. The method of claim 1, wherein
   at least one sample of the plurality of samples is processed by at least one auxiliary procedure before and/or after the reordering.

8. The method of claim 7, wherein the at least one auxiliary procedure comprises at least one of:
   adding at least one offset to the at least one sample,
   multiplying the at least one sample by at least one factor,
   clipping the at least one sample,
   filtering the at least one sample, or
   modifying the at least one sample based on T (X), wherein X represents a sample of the at least one sample and T represents a function.

9. The method of claim 1, wherein at least one of a first indication of whether to apply the reordering or a second indication of a reordering scheme for the reordering is included in the bitstream.

10. The method of claim 9, wherein the first indication or the second indication is coded with context coding.

11. The method of claim 9, wherein the at least one of the first and second indications is derived from coding information associated with the region.

12. The method of claim 11, wherein the coding information comprises at least one of:
    dimensions of the region,
    at least one coding mode of the region,
    at least one motion information associated with the region,
    at least one intra-prediction mode associated with the region,
    at least one inter-prediction mode associated with the region,
    at least one quantization parameter (QP) associated with the region,
    coding tree splitting information associated with the region, or
    at least one color format and/or color component associated with the region.

13. The method of claim 9, wherein
    at least one of a parsing scheme or a decoding scheme for the region depends on:
    whether the reordering is applied, and/or
    the reordering scheme for the reordering.

14. The method of claim 13, wherein the bitstream further includes a third indication whether the reordering is applied.

15. The method of claim 13, wherein the at least one of the parsing scheme or the decoding scheme comprises a scanning order and/or a filtering scheme.

16. The method of claim 9, wherein
    the region comprises a block coded with an Intra-Block Copy (IBC) mode, and
    the bitstream further comprises:
    a fourth indication whether the plurality of samples comprise a plurality of reconstruction samples, and/or
    a fifth indication of at least one reordering scheme for reconstruction samples.

17. The method of claim 16, wherein the fourth indication or the fifth indication is coded with context coding.

18. The method of claim 17, wherein the fifth indication is included in the bitstream if the plurality of samples comprise the plurality of reconstruction samples.

19. An apparatus for processing video data comprising a processor and a non-transitory memory with instructions thereon, wherein the instructions upon execution by the processor, cause the processor to:

reorder a plurality of samples in a region of a video during a conversion between the region and a bitstream of the video, wherein reordering the plurality of samples comprises changing an original position of a sample in the plurality of samples to a reordered position in the region based on a plurality of different functions for determining the reordered position using the original position; and perform the conversion based on the reordered plurality of samples.

20. A non-transitory computer-readable storage medium storing instructions that cause a processor to:

reorder a plurality of samples in a region of a video during a conversion between the region and a bitstream of the video, wherein reordering the plurality of samples comprises changing an original position of a sample in the plurality of samples to a reordered position in the region based on a plurality of different functions for determining the reordered position using the original position; and perform the conversion based on the reordered plurality of samples.

21. The method of claim 1, wherein the conversion comprises encoding the region into the bitstream, and/or wherein the conversion comprises decoding the region from the bitstream.

22. The method of claim 1, further comprising:

storing the bitstream in a non-transitory computer-readable recording medium.

\* \* \* \* \*